(12) United States Patent
Kim et al.

(10) Patent No.: US 8,300,065 B2
(45) Date of Patent: Oct. 30, 2012

(54) ROTATABLE DISPLAY DEVICE AND METHOD OF ADJUSTING IMAGE ON DISPLAY SCREEN OF THE SAME

(75) Inventors: Young-chan Kim, Uiwang-si (KR); Jae-hyung Chang, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/898,179

(22) Filed: Jul. 26, 2004

(65) Prior Publication Data

US 2005/0041147 A1 Feb. 24, 2005

(30) Foreign Application Priority Data

Aug. 21, 2003 (KR) .................. 10-2003-0057996

(51) Int. Cl.
*G09G 5/00* (2006.01)
(52) U.S. Cl. ........................................ 345/649
(58) Field of Classification Search .................. 345/649, 345/659, 655, 657, 652
See application file for complete search history.

(56) References Cited

U.S. PATENT DOCUMENTS

| | | | | | |
|---|---|---|---|---|---|
| 5,045,946 | A | * | 9/1991 | Yu | 348/565 |
| 5,329,289 | A | * | 7/1994 | Sakamoto et al. | 345/659 |
| 5,774,233 | A | | 6/1998 | Sakamoto | 358/451 |
| 5,828,351 | A | * | 10/1998 | Wu | 345/11 |
| 5,966,124 | A | * | 10/1999 | Devine | 715/764 |
| 5,973,664 | A | * | 10/1999 | Badger | 345/659 |
| 5,990,940 | A | * | 11/1999 | Hashimoto et al. | 348/184 |
| 6,195,079 | B1 | * | 2/2001 | Reddy | 345/3.1 |
| 6,281,895 | B1 | * | 8/2001 | Jeong | 715/810 |
| 6,297,861 | B1 | * | 10/2001 | Jo | 348/806 |
| 6,307,575 | B1 | * | 10/2001 | Matsushita | 715/788 |
| 6,329,998 | B1 | * | 12/2001 | Han | 345/581 |
| 6,346,972 | B1 | * | 2/2002 | Kim | 348/569 |
| 6,493,038 | B1 | * | 12/2002 | Singh et al. | 348/565 |
| 6,538,636 | B1 | * | 3/2003 | Harrison | 345/156 |
| 6,552,738 | B1 | * | 4/2003 | Lin et al. | 715/810 |
| 6,765,577 | B1 | * | 7/2004 | Tang et al. | 345/471 |
| 6,813,146 | B2 | * | 11/2004 | Haraguchi et al. | 361/679.55 |
| 6,897,882 | B1 | * | 5/2005 | Kim | 345/659 |

(Continued)

FOREIGN PATENT DOCUMENTS

EP 1071282 A2 1/2001

(Continued)

OTHER PUBLICATIONS

Korean Official Action issued on Jun. 23, 2005, for Korean Patent Application No. 2003-57996 (listing 1 reference).

(Continued)

*Primary Examiner* — Daniel Washburn
(74) *Attorney, Agent, or Firm* — Stanzione & Kim, LLP

(57) ABSTRACT

A rotatable display device and a method of adjusting an image on a display screen of the same include a command input unit which allows a user to input an image adjustment command, a display unit which displays images on a display screen, a first pivot processor which rotates the images corresponding to input signals according to a rotating direction of the display unit and outputs signals of the rotated images to the display unit, and a controller which adjusts the images on the display screen according to a relationship between the image adjustment command and the rotating direction of the display unit.

14 Claims, 2 Drawing Sheets

U.S. PATENT DOCUMENTS

| | | | |
|---|---|---|---|
| 7,289,102 B2 * | 10/2007 | Hinckley et al. | 345/156 |
| 2002/0140862 A1 * | 10/2002 | Dimitrova et al. | 348/565 |
| 2003/0098847 A1 * | 5/2003 | Yamamoto | 345/158 |
| 2004/0012724 A1 * | 1/2004 | Jang | 348/739 |
| 2004/0217988 A1 * | 11/2004 | Bear et al. | 345/771 |

FOREIGN PATENT DOCUMENTS

| | | |
|---|---|---|
| JP | 04-326394 | 11/1992 |
| JP | 6-274307 | 9/1994 |
| JP | 8-171378 | 7/1996 |
| JP | 11-085445 | 3/1999 |
| JP | 2000-20046 | 1/2000 |
| JP | 2000-066653 | 3/2000 |
| JP | 2000-148122 | 5/2000 |
| JP | 2001-067004 | 3/2001 |
| JP | 2001-142445 | 5/2001 |
| JP | 2002044520 A * | 2/2002 |
| JP | 2002140062 A * | 5/2002 |
| JP | 2003-101844 | 4/2003 |
| JP | 2003-162277 | 6/2003 |
| JP | 2003-198975 | 7/2003 |
| JP | 2003-223256 | 8/2003 |
| KR | P2000-74855 | 10/2000 |
| KR | P2001-97994 | 8/2001 |
| KR | P2002-41199 | 6/2004 |

OTHER PUBLICATIONS

Japanese Office Action issued Sep. 7, 2010 in JP Application No. 2004-239301.

JP Office Action issued Sep. 27, 2011 in JP Patent Application No. 2004-239301.

* cited by examiner

ROTATABLE DISPLAY DEVICE AND METHOD OF ADJUSTING IMAGE ON DISPLAY SCREEN OF THE SAME

CROSS-REFERENCE TO RELATED APPLICATIONS

This application claims the priority of Korean Patent Application No. 2003-57996, filed on Aug. 21, 2003, in the Korean Intellectual Property Office, the disclosure of which is incorporated herein in its entirety by reference.

BACKGROUND OF THE INVENTION

1. Field of the Invention

The present general inventive concept relates to a rotatable display device, and more particularly, to a rotatable display device and a method of adjusting an image on a display screen of the same according to a rotating direction of the display device.

2. Description of the Related Art

A rotatable display device can be rotated using a pivot function for rotating the display device to a vertical or horizontal position. When the display device is rotated, an image on a display screen of the display device is also adjusted according to a rotating direction of the display device.

For example, when the display device is rotated clockwise or counterclockwise to the vertical position, as shown in FIG. 1, the image displayed on the display screen is also rotated in the same direction. If the image includes an on-screen-display (OSD) message or a picture-in-picture (PIP) sub-picture, the OSD message or the PIP sub-picture is also rotated in the same direction.

However, after being rotated, the rotatable display device maintains its original screen adjustment function and/or keys unchanged, so that a user should adjust the image on the display screen.

For example, when the user manipulates a vertical movement key to move the image or the OSD message on the rotated display screen in a vertical direction, the image or the OSD message may actually be moved in a horizontal direction. Thus, in order to move the image on the rotated display screen in the vertical or horizontal direction, the user should manipulate an opposite movement key to a desired direction. Also, in adjusting an image of the rotated OSD message, the user has to input a proper adjustment command, considering the existing adjustment function (keys) and the rotating direction of the OSD message image. Correspondingly, when the user wishes to adjust the rotated PIP sub-picture, the user has to input the proper adjustment command, considering both an original PIP sub-picture position before rotation and a present PIP sub-picture position after rotation.

SUMMARY OF THE INVENTION

In order to solve the foregoing and/or other problems, it is an aspect of the present general inventive concept by providing a rotatable display device to adjust an image according to a rotational direction of the rotatable display device, and a method of adjusting an image of a display screen of the same.

Additional aspects and advantages of the present general inventive concept will be set forth in part in the description which follows and, in part, will be obvious from the description, or may be learned by practice of the general inventive concept.

The foregoing and/or other aspects of the present general inventive concept may be achieved by providing a rotatable display device including a command input unit which allows a user to input an image adjustment command, a display unit which displays images on a display screen, a first pivot processor which processes input signals to rotate the image according to a rotating direction of the display unit and outputs signals of the rotated images to the display unit, and a controller which adjusts the images on the display screen according to a relationship between the image adjustment command and the rotating direction of the display unit.

In an aspect of the present general inventive concept, the rotatable display device may further include a format conversion unit which converts the signals output from the first pivot processor into a format to be displayed on the display unit according to a control signal received from the controller.

In another aspect of the present general inventive concept, the controller can generate a second control signal to adjust on-screen-display (OSD) message images and/or a sub picture of picture-in-picture included in the images on the display screen.

In yet another aspect of the present general inventive concept, the rotatable display device may further include a second pivot processor which rotates the on-screen-display message images according to the rotating direction of the display screen.

The foregoing and/or other aspects of the present general inventive concept may also be achieved by providing a method of adjusting an image on a display screen of a rotatable display device, the method including receiving a command to adjust the image and checking a relationship between the command and a rotating direction of the display device, and adjusting the image on the display screen based on a result of checking the relationship.

In an aspect of the present general inventive concept, if the command is to adjust a horizontal width or horizontal movement of the image and the display device is rotated, the adjusting of the image on the display screen may include adjusting a vertical width or vertical movement of the image on the display screen, and if the command is to adjust the vertical width or vertical movement of the image and the display screen is rotated, the adjusting of the image on the display screen may include adjusting the horizontal width or horizontal movement of the image on the display screen.

In another aspect of the present general inventive concept, the checking of the relationship may include checking whether the rotating direction of the display device is clockwise or counter-clockwise, and checking whether the command is to adjust the horizontal width/horizontal movement or the vertical width/vertical movement of the image, and the adjusting of the image may include adjusting the image on the display screen by increasing or decreasing the horizontal width of the image or increasing or decreasing the vertical width, according to the result of checking the relationship.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
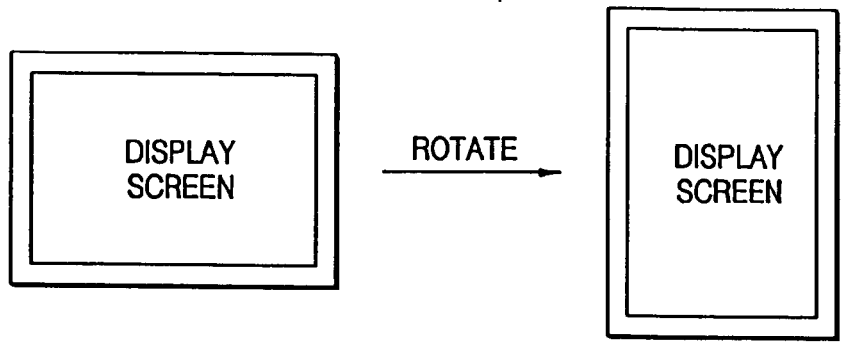
FIG. 1 shows a display screen of a rotatable display device rotated from a horizontal position to a vertical position.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
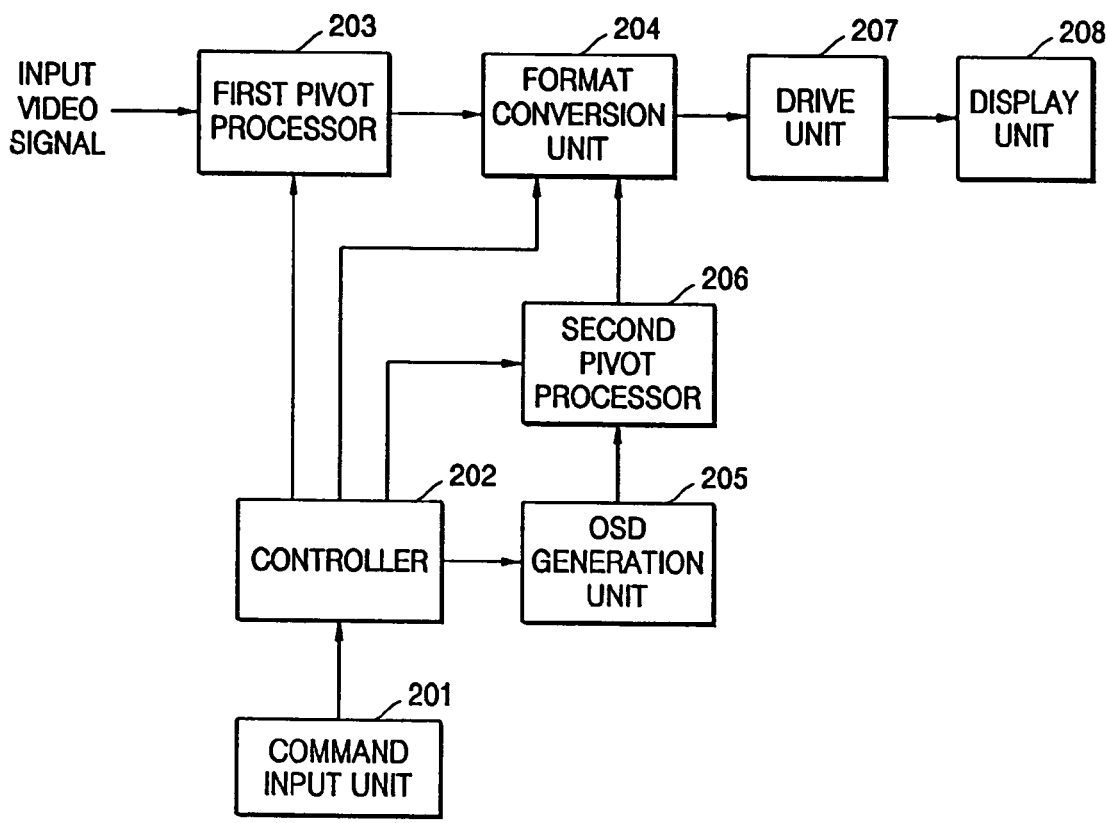
FIG. 2 is a schematic functional block diagram showing a rotatable display device according to an embodiment of the present general inventive concept.

FIG. 2 is a schematic functional block diagram showing a rotatable display device according to an embodiment of the present general inventive concept. The rotatable display device may include a command input unit 201, a controller 202, a first pivot processor 203, a format conversion unit 204, an on-screen display (OSD) generation unit 205, a second pivot processor 206, a drive unit 207, and a display unit 208.

The command input unit 201 can allow a user to input an image adjustment command. The image adjustment command may include a command to increase/decrease a horizontal width or a vertical width of an image on a display screen, as well as a command to move a horizontal position or a vertical position of the image. The command to increase/decrease a size of the image and to move a position of the image can be performed using (+)/(−) keys (not shown).

When the display unit 208 is rotated and the image adjustment command from the command input unit 201 is received by the controller 202, the controller 202 can generate control signals to adjust the image on the display screen of the display unit 208, considering a relationship between the received screen adjustment command and a rotating direction of the display unit 208.

Specifically, when the image adjustment command is a command to increase/decrease the horizontal width of the image, the controller 202 can check whether a parameter Pivot_rotation indicates a pivot angle of the display unit 208. The parameter Pivot_rotation can be set automatically or by a user when the display unit 208 is rotated.

If it is determined from the parameter Pivot_rotation that the display unit 208 is rotated clockwise (CW) by 90°, and the image adjustment command is to increase the horizontal width of the image (using a (+) key), the controller 202 can generate a control signal to increase the vertical width of the image.

If it is determined from the parameter Pivot_rotation that the display unit 208 is rotated clockwise (CW) by 90°, and the image adjustment command is to decrease the horizontal width of the image (using a (−) key), the controller 202 can generate a control signal to decrease the vertical width of the image.

If it is determined from the parameter Pivot_rotation that the display unit 208 is rotated counter-clockwise (CCW) by 90°, and the image adjustment command is to increase the horizontal width of the image (using the (+) key), the controller 202 can generate a control signal to decrease the vertical width of the image.

If it is determined from the parameter Pivot_rotation that the display unit 208 is rotated counter-clockwise (CCW) by 90°, and the screen adjustment command received from the command input unit 201 is to decrease the width of the display screen (using the (−) key), the controller 202 can generate a control signal to increase the vertical width of the image.

If it is determined from the parameter Pivot_rotation that the display unit 208 is rotated clockwise (CW) by 90°, and the image adjustment command is to increase the vertical width of the image (using the (+) key), the controller 202 can generate a control signal to decrease the horizontal width of the image.

If it is determined from the parameter Pivot_rotation that the display unit 208 is rotated clockwise (CW) by 90°, and the image adjustment command is to decrease the vertical width of the image (using the (−) key), the controller 202 can generate a control signal to increase the horizontal width of the image.

If it is determined from the parameter Pivot_rotation that the display unit 208 is rotated counter-clockwise (CCW) by 90°, and the image adjustment command is to increase the vertical width of the image (using the (+) key), the controller 202 can generate a control signal to increase the horizontal width of the image.

If it is determined from the parameter Pivot_rotation that the display unit 208 is rotated counter-clockwise (CCW) by 90°, and the image adjustment command is to decrease the vertical width of the image (using the (−) key), the controller 202 can generate a control signal to decrease the horizontal width of the image.

The control signal to adjust the image, as described above, may be defined as a first control signal and sent to the format conversion unit 204.

In addition, the controller 202 can generate a second control signal to process an input signal (input video signal) corresponding to the image to rotate the image of the input signal and a third control signal to rotate an OSD message image, based on the parameter Pivot_rotation, and sends the second and third control signals to the first pivot processor 203 and the second pivot processor 206, respectively.

Table 1 below shows the first control signal generated by the controller 202 according to the image adjustment command and a rotating status of the display unit 208 indicated by the parameter Pivot_rotation.

|  |  | Parameter of pivot angle | |
|---|---|---|---|
| Image adjustment command | | Pivot_rotation = CW90 | Pivot_rotation = CCW90 |
| H-width | Increment(+) | V+ | V− |
|  | Decrement(−) | V− | V+ |
| V-width | Increment(+) | H− | H+ |
|  | Decrement(−) | H+ | H− |

In table 1, V+ is the control signal to increase the vertical width of the image, V− is the control signal to decrease the vertical width of the image, H+ is the control signal to increase the horizontal width of the image, and H− is the control signal to decrease the horizontal width of the image.

The first pivot processor 203 can receive the second control signal and can rotate the image of the input signal according to the rotating direction of the display unit 208. If the display unit 208 is rotated clockwise (CW) by 90°, the first pivot processor 203 can rotate the image of the input signal clockwise (CW) by 90°. If the display unit 208 is rotated counter-clockwise (CCW) by 90°, the first pivot processor 203 can rotate the image of the input signal counter-clockwise (CW) by 90°. The image of the input signal may be a background picture, a television program or a cable picture, or a PIP picture. If the image of the input signal is the PIP picture, since there are two images, the first pivot processor 203 can separately rotate the two images. The first pivot processor 203 can send a signal of the rotated image to the format conversion unit 204.

The OSD generation unit 205 can generate the OSD message according to an OSD control signal generated by the controller 202. The OSD message can be sent to the second pivot processor 206.

The second pivot processor 206 can rotate an image of the OSD message image received from the OSD generation unit 205 by the third control signal received from the controller 202. The third control signal can be generated according to the rotating direction of the display unit 209. If the display unit 208 is rotated clockwise (CW) by 90°, the second pivot processor 206 can rotate the OSD message image clockwise (CW) by 90°, and if the display unit 208 is rotated counter-clockwise (CCW) by 90°, the second pivot processor 206 can rotate the OSD message image counter-clockwise (CCW) by 90°. A signal of the rotated OSD message image can be sent to the format conversion unit 204.

If the second and third control signals generated by the controller 202 indicate that the parameter Pivot_rotation is '0', which represents that the display unit 208 has not been rotated, the first and second pivot processors 203 and 206 can pass the image of the input video signal to the format conversion unit 204 without pivoting or rotating, respectively. The first pivot processor 203 and second pivot processor 206 can define a processor unit to rotate a first image and a second image to be displayed on the display unit 208 according to the rotation of the display unit 208. The first image can be received from an external source, and the second image can be generated inside of the display device. Also, if an image to be displayed on the display unit 208 has a PIP-image, the first image can be a main image of the PIP-image, and the second image can be a sub-image of the PIP-image.

The format conversion unit 204 can receive the image signals from the first pivot processor 203 and the second pivot processor 206. The format conversion unit 204 can convert the image signals into a format to be displayed on the display unit 208 according to the first control signal generated from the control unit 202.

The drive unit 207 can receive signals output from the format conversion unit 204 and can drive the display unit 208 to display the signals output by the format conversion unit 204 on the display screen of the display unit 208.

The display unit 208 can be controlled by the drive unit 207 to display images corresponding to the input signals, OSD messages, or PIP pictures on its display screen.

Figure 3:
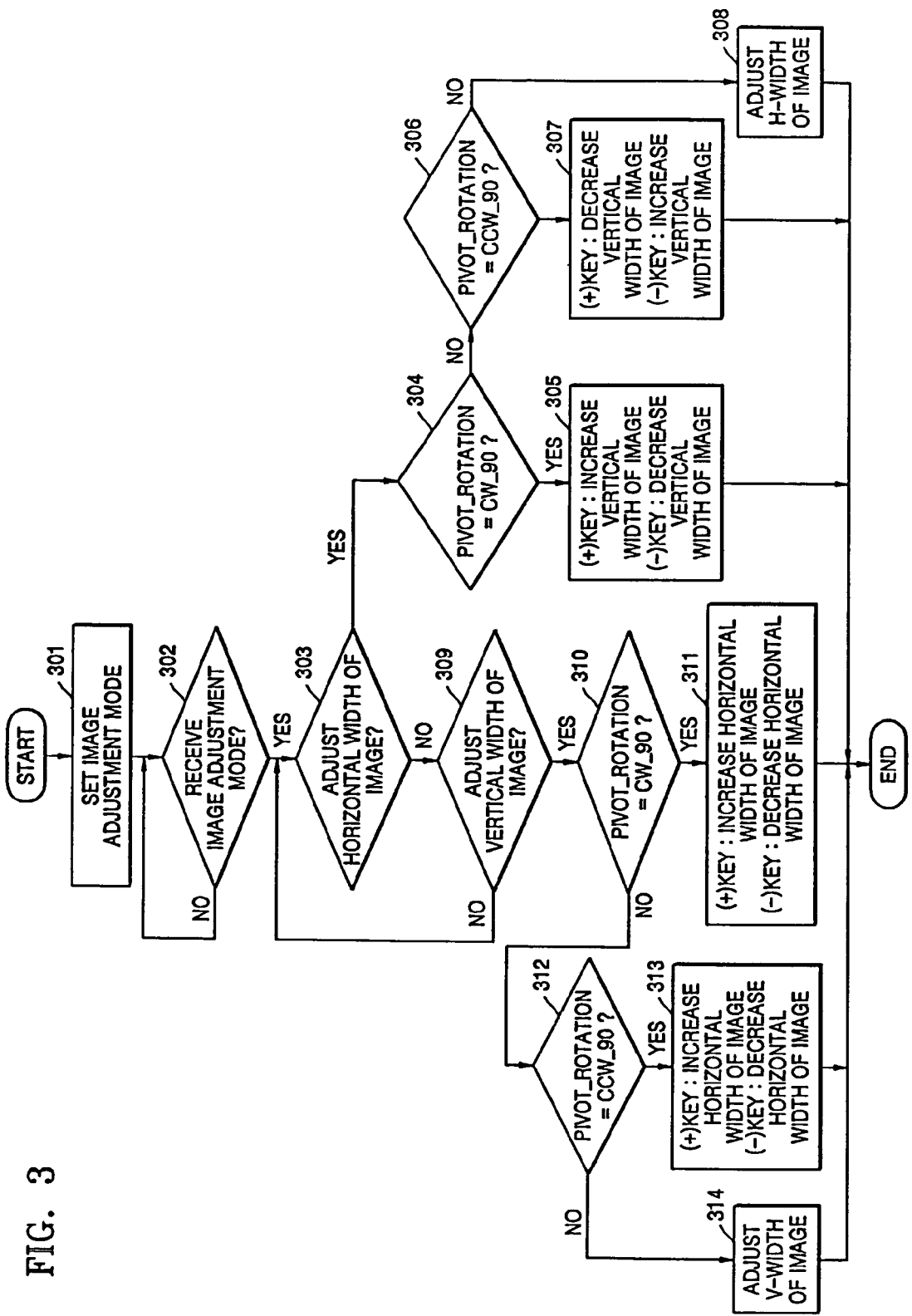
FIG. 3 is a flowchart showing a method of adjusting an image on a display screen of a rotatable display device according to another embodiment of the present general inventive concept.

FIG. 3 is a flowchart showing a method of adjusting an image on a display screen of a rotatable display device. The method will be described with reference to FIGS. 2 and 3. It can be assumed that the parameter Pivot_rotation is automatically or manually set in advance in the controller 202 according to any direction in which the display unit 208 is rotated.

Referring to FIGS. 2 and 3, an image adjustment mode is set in operation 301. If an image adjustment command is received in operation 302, it is determined whether the image adjustment command is a horizontal width adjustment command in operation 303.

If it is determined that the image adjustment command is the horizontal width adjustment command in operation 303, it can be checked whether the parameter Pivot_rotation indicates that the display unit 208 is rotated clockwise by 90° (CW_90) in operation 304.

If the parameter Pivot_rotation indicates that the display unit 208 is rotated clockwise (CW) by 90° in operation 304, the vertical width of the image on the display screen of the display unit 208 can be adjusted in operation 305. If the (+) key is manipulated or a horizontal width increase command is input by a user, the vertical width of the image on the display screen can be increased when the display unit 208 is rotated, and if the (−) key is manipulated or a horizontal width decrease command is input by the user, the vertical width of the image on the display screen can be decreased.

If the parameter Pivot_rotation does not indicate that the display unit 208 is rotated clockwise by 90° in operation 304, it can be checked whether the parameter Pivot_rotation indicates that the display unit 208 is rotated counter-clockwise by 90° (CCW_90) in operation 306.

If the parameter Pivot_rotation indicates that the display unit 208 is rotated counter-clockwise by 90° in operation 306, the vertical width of the image on the display screen of the display unit 208 can be adjusted in operation 307. If the (+) key is manipulated or the horizontal width increase command is input by the user, the vertical width of the image on the display screen can be decreased, and if the (−) key is manipulated or the horizontal width decrease command is input by the user, the vertical width of the image on the display screen can be increased in operation 307.

If the parameter Pivot_rotation does not indicate that the display unit 208 is rotated counter-clockwise by 90° in operation 306, the horizontal width (H-WIDTH) of the image on the display screen of the display unit 208 can be adjusted in operation 308. If the (+) key is manipulated or the horizontal width increase command is input by the user in operation 308, the horizontal width (H-WIDTH) of the image on the display screen can be increased in operation 308, and if the (−) key is manipulated by the user, the horizontal width of the image on the display screen can be decreased in the operation 308.

If the image adjustment command is not the horizontal width adjustment command in operation 303, it can be checked whether the command is a vertical width adjustment command in operation 309.

If it is determined that the vertical width adjustment command is input by the user in operation 309, it can be checked whether the parameter Pivot_rotation indicates that the display device 208 is rotated clockwise by 90° (CW_90) in operation 310.

If the parameter Pivot_rotation indicates that the display device 208 is rotated clockwise by 90° in operation 310, the horizontal width of the image on the display screen of the display unit 208 can be adjusted in operation 311. If the (+) key is manipulated or a vertical width increase command is input by the user in operation 311, the horizontal width of the image on the display screen can be decreased, and if the (−) key is manipulated or a vertical width decrease command is input by the user, the horizontal width of the image on the display screen can be increased.

If the parameter Pivot_rotation does not indicate that the display unit 208 is rotated clockwise by 90° in operation 310, it can be checked whether the display unit 208 is rotated counter-clockwise by 90° based on the parameter Pivot_rotation in operation 312.

If the parameter Pivot_rotation indicates that the display unit 208 is rotated counter-clockwise by 90° in operation 312, the horizontal width of the image on the display screen of the display unit 208 can be adjusted in operation 313. If the (+) key is manipulated or a vertical width increase command is input by the user, the horizontal width of the image on the display screen can be increased, and if the (−) key is manipulated or the vertical width decrease command is input by the user, the horizontal width of the image on the display screen can be decreased in operation 313.

If the parameter Pivot_rotation does not indicate that the display unit 208 is rotated counter-clockwise by 90° in operation 312, the vertical width of the image on the display screen of the display unit 208 can be adjusted in operation 314. If the (+) key is manipulated or the vertical width increase command is input by the user, the vertical width (V-WIDTH) of the image on the display screen can be increased, and if the (−) key is manipulated or the vertical width decrease command is input by the user, the vertical width of the image on the display screen can be decreased in operation 314.

If it is determined that the vertical width adjustment command has not been input by the user in operation 309, the method is returned to operation 303.

In an aspect of this embodiment, the vertical width or horizontal width of the image on the display screen can be adjusted. However, the display device may be implemented to adjust a vertical movement or a horizontal movement of the image on the display screen according to another aspect of the present inventive concept. A function key to control the vertical movement or the horizontal movement may be used as a directional key.

Accordingly, in this method according to an aspect of the present general inventive concept, if the command is given to adjust the horizontal width or horizontal movement of the image, and the display device is rotated, the vertical width or vertical movement of the image on the display screen can be adjusted. If the command is given to adjust the vertical width or vertical movement of the image on the display screen, and the display device is rotated, the horizontal width or horizontal movement of the image on the display screen can be adjusted.

Also, in this method, according to whether the rotational direction of the display device is clockwise or counter-clockwise, and whether the image adjust command is to adjust the horizontal width/horizontal movement or the vertical width/vertical movement of the image, the image on the display screen can be adjusted by increasing or decreasing the horizontal width of the image or increasing or decreasing the vertical width of the image.

The present general inventive concept processes a screen adjustment command input by a user to adjust the display screen according to the rotating direction of the display device, so that the user can easily adjust the display screen with the same adjustment commands or keys, regardless of the rotating direction of the display device.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A rotatable display device comprising:
a display unit to display an image of an input signal of the rotatable display device;
a command input unit to input at least one adjustment command for the image;
a controller to receive the adjustment command to directly adjust a dimension of the image from a user and to change the adjustment command to another adjustment command according to a rotating direction of the display unit, when the display unit is rotated and the adjustment command is input, and to generate a first control signal to adjust the image on the display unit according to the changed another adjustment command;
an on-screen display (OSD) unit to generate an OSD message, wherein the OSD unit generates the OSD message in response to an OSD control signal generated by the controller when the adjustment command is input; and
a pivot processor to rotate the displayed image according to the rotation direction of the display unit,
wherein the displayed image includes at least two images and the OSD message,
wherein adjusting the image on the display unit according to the changed another adjustment command comprises adjusting the at least two images and the OSD message according to the changed another adjustment command, when the adjustment command is input, and
wherein the pivot processor is enabled to separately rotate the at least two images and the OSD message.

2. The rotatable display device of claim 1, wherein the at least one adjustment command directly adjusts the dimension of the image from a user and comprises a command to adjust a location of the image displayed on the display unit.

3. The rotatable display device of claim 1, wherein the at least one adjustment command directly adjusts a dimension of the image from a user and comprises at least one of a horizontal width adjustment command for the image, a horizontal location movement command for the image, a vertical width adjustment command for the image, and a vertical location movement command for the image.

4. The rotatable display device of claim 1, wherein, when the display unit is rotated and the adjustment command directly adjusts a dimension of the image from a user and is a horizontal adjustment command, the controller changes the horizontal adjustment command to a vertical adjustment command,
when the display unit is rotated and the adjustment command is the vertical adjustment command, the controller changes the vertical adjustment command to the horizontal adjustment command, and
wherein the horizontal adjustment command includes at least one of a horizontal width adjustment command and a horizontal location movement command, and the vertical adjustment command includes at least one of a vertical width adjustment command and a vertical location movement command.

5. The rotatable display device of claim 1, wherein the rotating direction is one of a first direction from a first position to a second position and a second direction from the second position to the first position, and
wherein the first direction is a horizontal direction with respect to a base of the display unit and the second direction is a vertical direction with respect to the base of the display unit.

6. The rotatable display device of claim 1, wherein at least one key corresponding to the at least one adjustment command of the command input unit is disposed on the display unit.

7. The rotatable display device of claim 1, wherein the pivot processor comprises a first pivot processor to separately rotate the at least two images and a second pivot processor to rotate the OSD message.

8. A method of adjusting an image displayed on a display unit included in a rotatable display device, the method comprising:
rotating the displayed image according to the rotating direction of the display unit;
checking whether the display unit is rotated, when receiving an adjustment command to directly adjust a dimension of the image from a user;
changing the adjustment command to another adjustment command when the display unit is rotated; and
adjusting the displayed image according to the changed another adjustment command;

wherein the displayed image includes at least two images and an on-screen display (OSD) message, wherein adjusting the displayed image according to the changed another adjustment command comprises adjusting the at least two images and the OSD message according to the changed another adjustment command, when the adjustment command is input, and wherein the at least two images and the OSD message are to be separately rotated according to the rotating direction of the display unit.

9. The method of claim 8, wherein the adjustment command to directly adjust a dimension of the image from a user comprises a command to adjust a location of the image displayed on the display unit.

10. The method of claim 8, wherein the adjustment command to directly adjust a dimension of the image from a user comprises at least one of a horizontal width adjustment command for the image, a horizontal location movement command for the image, a vertical width adjustment command for the image, and a vertical location movement command for the image.

11. The method of claim 8, wherein, when the display unit is rotated and the adjustment command to directly adjust a dimension of the image from a user is a horizontal adjustment command, the changing of the adjustment command to another adjustment command comprises changing the horizontal adjustment command to a vertical adjustment command, when the display unit is rotated and the adjustment command is the vertical adjustment command, the changing of the adjustment command to another adjustment command comprises changing the vertical adjustment command to the horizontal adjustment command, and wherein the horizontal adjustment command includes at least one of a horizontal width adjustment command and a horizontal location movement command, the vertical adjustment command includes at least one of a vertical width adjustment command and a vertical location movement command.

12. The method of claim 8, wherein the rotating direction is one of a first direction from a first position to a second position and a second direction from the second position to the first position, and wherein the first direction is a horizontal direction with respect to a base of the display unit and the second direction is a vertical direction with respect to the base of the display unit.

13. A rotatable display device comprising:

a display unit to display an image of an input signal;

a command input unit to input at least one adjustment command for the image;

a controller to receive an adjustment command to directly adjust a dimension of the image from a user and to change the adjustment command to another adjustment command according to a pivot parameter measuring the pivot angle of the display unit, when the display unit is rotated and the adjustment command from the command input unit is input;

a pivot processor to determine the pivot angle of the display unit and to rotate the image according to the pivot angle, where the image is a picture-in-picture (PIP) image having two images, and where the pivot processor separately rotates the two images; and a format conversion unit to directly adjust a dimension of the image according to the changed another adjustment command, where directly adjusting the image comprises adjusting the two images according to the changed another adjustment command when the display unit is rotated and the adjustment command from the command input unit is input.

14. The rotatable display device of claim 13, wherein the displayed image further comprises an on-screen display (OSD) message which is to be displayed when the adjustment command is input, and wherein the pivot processor is enabled to separately rotate the two images and the OSD message.

* * * * *